(12) United States Patent
Jiang et al.

(10) Patent No.: US 12,237,866 B2
(45) Date of Patent: Feb. 25, 2025

(54) METHOD AND SYSTEM FOR DETECTING AN IMPROPER PROTECTION IN AN OPTICAL COMMUNICATION NETWORK

(71) Applicant: HUAWEI TECHNOLOGIES CO., LTD., Guangdong (CN)

(72) Inventors: Zhiping Jiang, Kanata (CA); Jiachuan Lin, Quebec (CA); Behnam Naghdi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 206 days.

(21) Appl. No.: 18/183,256

(22) Filed: Mar. 14, 2023

(65) Prior Publication Data

US 2024/0313858 A1    Sep. 19, 2024

(51) Int. Cl.
*H04B 10/07* (2013.01)
*H04B 10/071* (2013.01)
(Continued)

(52) U.S. Cl.
CPC ....... *H04B 10/0771* (2013.01); *H04B 10/071* (2013.01); *H04B 10/0775* (2013.01);
(Continued)

(58) Field of Classification Search
CPC .............. H04B 10/0771; H04B 10/071; H04B 10/0775; H04B 10/03; H04B 10/032;
(Continued)

(56) References Cited

U.S. PATENT DOCUMENTS 4,911,515 A * 3/1990 So .................. H04B 10/071
356/73.1
5,000,568 A * 3/1991 Trutna, Jr. ......... G01M 11/3118
356/73.1
(Continued)

OTHER PUBLICATIONS

Li et al, Research and Experiment on AI-based Co-cable and Co-trench Optical Fibre Detection, Sep. 2022, ECOC, All Document. (Year: 2022).*

(Continued)

*Primary Examiner* — Dibson J Sanchez
(74) *Attorney, Agent, or Firm* — BCF LLP

(57) ABSTRACT

The disclosed systems, and methods for detecting an improper protection in an optical communication network comprising: i) receiving, by a first Coherent-Optical Time Domain Reflectometer (C-OTDR), a first reflected optical signal from a first optical fiber; ii) receiving, by a second C-OTDR, a second reflected optical signal from a second optical fiber; iii) pre-processing, by a processor, the first reflected optical signal and the second reflected optical signal; iv) determining, by the processor, a category of the first C-OTDR and the second C-OTDR; v) depending upon the category of the first C-OTDR and the second C-OTDR, computing a correlation between the first preprocessed reflected optical signal and the second preprocessed reflected optical signal based on a first correlation computation technique or a second correlation computation technique; and vi) based on the computed correlation, detecting the improper protection in the optical communication network.

20 Claims, 9 Drawing Sheets

(51) Int. Cl.
*H04B 10/077* (2013.01)
*G01M 11/00* (2006.01)
*H04B 10/03* (2013.01)
*H04B 10/032* (2013.01)
*H04B 10/25* (2013.01)
*H04J 14/02* (2006.01)

(52) U.S. Cl.
CPC ..... *G01M 11/3109* (2013.01); *G01M 11/3136* (2013.01); *H04B 10/03* (2013.01); *H04B 10/032* (2013.01); *H04B 10/07* (2013.01); *H04B 10/25* (2013.01); *H04J 14/02* (2013.01); *H04J 14/0287* (2013.01)

(58) Field of Classification Search
CPC ... H04B 10/07; H04B 10/25; G01M 11/3109; G01M 11/3136; H04J 14/02; H04J 14/0287
USPC ................................ 398/1–8, 9–38, 43–103
See application file for complete search history.

(56) References Cited

U.S. PATENT DOCUMENTS

| | | | | |
|---|---|---|---|---|
| 6,369,883 | B1* | 4/2002 | Clark | G01N 21/59 356/73.1 |
| 8,218,924 | B1* | 7/2012 | Schantz | G02B 6/02057 385/100 |
| 10,411,796 | B1* | 9/2019 | Archambault | G01M 11/3163 |
| 10,432,302 | B1* | 10/2019 | Delgado | H04J 14/02 |
| 11,108,463 | B1* | 8/2021 | Jiang | H04B 10/532 |
| 2006/0245468 | A1* | 11/2006 | Hartog | G01K 11/32 374/161 |
| 2011/0153544 | A1* | 6/2011 | Nagel | H04B 10/071 706/54 |
| 2012/0014690 | A1* | 1/2012 | Gruber | H04B 10/07951 398/25 |
| 2013/0038879 | A1* | 2/2013 | Dorize | G01M 11/3127 356/445 |
| 2013/0259466 | A1* | 10/2013 | Chen | H04B 10/071 398/5 |
| 2014/0003821 | A1* | 1/2014 | Joffe | G01M 11/3118 398/147 |
| 2014/0078506 | A1* | 3/2014 | Hu | G01M 11/3118 356/445 |
| 2016/0241333 | A1* | 8/2016 | Chen | H04B 10/0731 |
| 2017/0126316 | A1* | 5/2017 | Yuan | H04B 10/07957 |
| 2018/0259422 | A1* | 9/2018 | Castro | G01M 11/3127 |
| 2019/0025095 | A1* | 1/2019 | Steel | G01D 5/35358 |
| 2019/0078949 | A1* | 3/2019 | Hung | G01K 11/3206 |
| 2019/0097719 | A1* | 3/2019 | Chedore | H04Q 11/0005 |
| 2019/0287370 | A1* | 9/2019 | Birnkrant | G08B 17/06 |
| 2020/0249076 | A1* | 8/2020 | Ip | G01H 9/004 |
| 2022/0247488 | A1* | 8/2022 | Jiang | G01H 9/004 |
| 2023/0006738 | A1* | 1/2023 | Chen | G01M 11/3136 |
| 2023/0013049 | A1* | 1/2023 | Luo | G01M 11/3136 |
| 2023/0073872 | A1* | 3/2023 | Cuenot | H04B 10/674 |
| 2023/0152183 | A1* | 5/2023 | Cahill | G01M 11/3127 356/73.1 |
| 2024/0125671 | A1* | 4/2024 | Murphy | G01M 11/088 |
| 2024/0167911 | A1* | 5/2024 | Cirinna' | G08B 21/18 |
| 2024/0223274 | A1* | 7/2024 | Saget | H04B 10/071 |

OTHER PUBLICATIONS

Zhao et al., Field Trail of Shared Risk Optical Fiber Links Detection Based on OTDR and AI Algorithm, Nov. 2022, ACP, All Document. (Year: 2022).*

Zhu, T et al., "Sensing Earth and environment dynamics by telecommunication fiber-optic sensors: an urban experiment in Pennsylvania, USA", Solid Earth, 12, 219-235, Jan. 28, 2021.

* cited by examiner

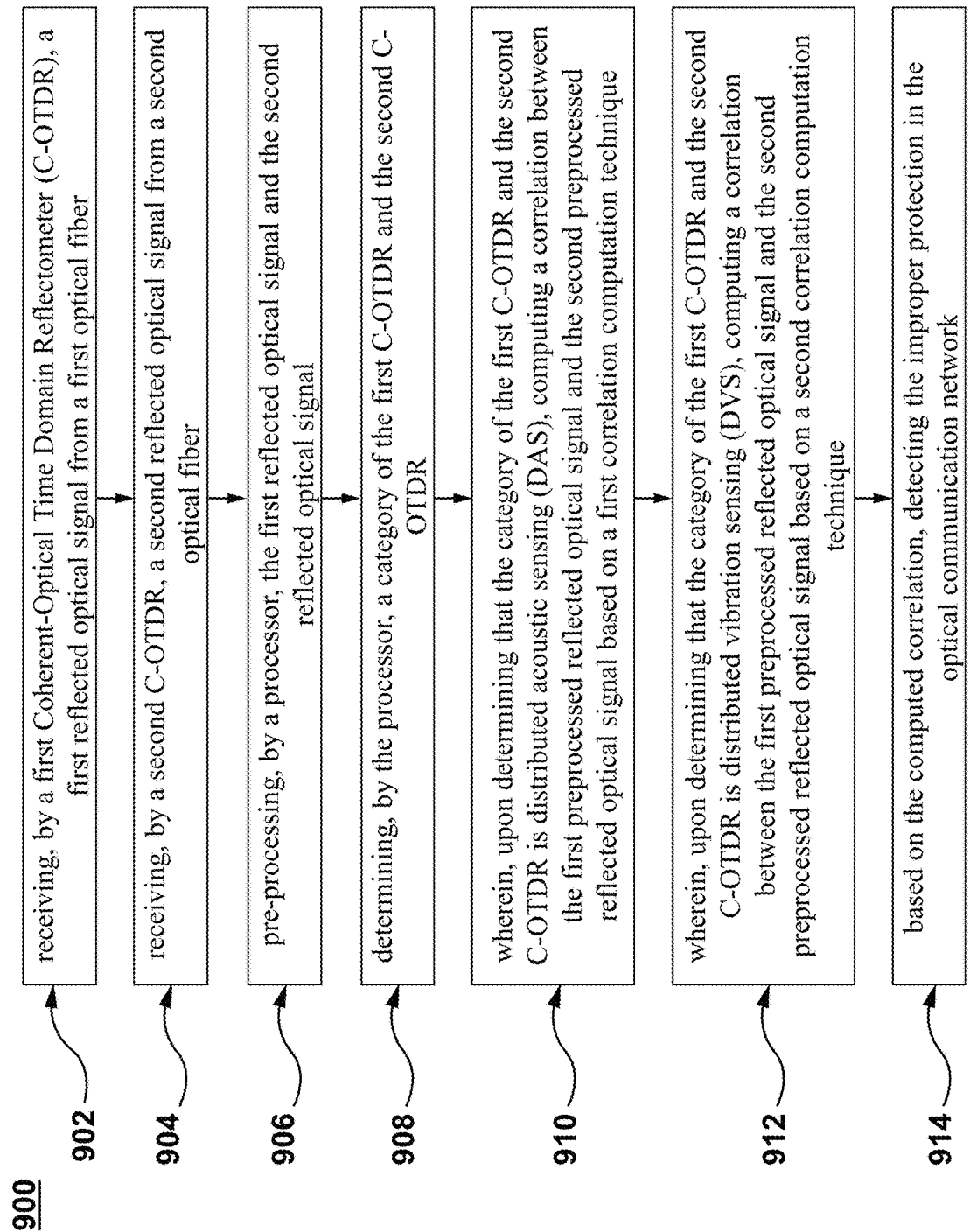

METHOD AND SYSTEM FOR DETECTING AN IMPROPER PROTECTION IN AN OPTICAL COMMUNICATION NETWORK

CROSS-REFERENCE TO RELATED APPLICATIONS

This is the first application filed for the instantly disclosed technology.

TECHNICAL FIELD

The present disclosure generally relates to the field of optical communication networks and, in particular, to methods and systems for detecting an improper protection in an optical communication network.

BACKGROUND

Typical implementation of optical networks, such as, for example, dense wavelength division multiplex (DWDM) networks, involve providing a working path and a protection path in order to provide seamless communication. So, in case of an optical fiber link failure in the working path, traffic is routed through the protection path. Such path protection generally requires that the optical fiber links of the working path and the protection path are disjointed to reduce the probability of the protection path and the working path being simultaneously interrupted due to the same optical fiber link failure.

However, the requirement of optical fiber links of the working path being independent and disjoint to the protection path is at times breached by the optical layer. Such breaches include at least a portion of working path and a portion of protection path sharing the same optical fiber, or different optical fibers within same optical cable, or different optical fiber cables that are spatially close to each other.

To this end, there is an interest in developing efficient methods and systems for detecting an improper protection in an optical communication network.

SUMMARY

The embodiments of the present disclosure have been developed based on developers' appreciation of shortcomings associated with the prior art. Generally, the conventional techniques for detecting an improper protection in an optical communication network rely on coherent Optical Time Domain Reflectometers (C-OTDRs), the C-OTDRs simultaneously monitor the two optical fibers under test. The conventional techniques generate 2D waterfall diagrams from the optical fibers under test. To determine whether two optical fibers are co-cable or not, strong events around the optical fiber (e.g., a vehicle passing over a buried optical fiber) which can create clear and distinct patterns/features in 2D waterfall diagrams is required. The conventional techniques rely on image processing techniques that requires strong perturbations to distinguish the two 2D waterfall diagrams. In practice with optical fibers subject to low-impact events and conditions, the optical fiber properties are weakly perturbed resulting in patterns/features in 2D waterfall diagrams buried in the noise.

The developers of the present disclosure have devised efficient methods and systems for detecting an improper protection in an optical communication network. More particularly, instead of image processing techniques, various embodiments of the present disclosure rely on correlation between optical signals reflected from the optical fibers.

In accordance with the first broad aspect of the present disclosure, there is provided a method for detecting an improper protection in an optical communication network, the method comprising: receiving, by a first Coherent-Optical Time Domain Reflectometer (C-OTDR), a first reflected optical signal from a first optical fiber; receiving, by a second C-OTDR, a second reflected optical signal from a second optical fiber; pre-processing, by a processor, the first reflected optical signal and the second reflected optical signal; determining, by the processor, a category of the first C-OTDR and the second C-OTDR; wherein, upon determining that the category of the first C-OTDR and the second C-OTDR is distributed acoustic sensing (DAS), computing a correlation between the first preprocessed reflected optical signal and the second preprocessed reflected optical signal based on a first correlation computation technique; wherein, upon determining that the category of the first C-OTDR and the second C-OTDR is distributed vibration sensing (DVS), computing a correlation between the first preprocessed reflected optical signal and the second preprocessed reflected optical signal based on a second correlation computation technique; and based on the computed correlation, detecting the improper protection in the optical communication network.

In accordance with any embodiments of the present disclosure, the pre-processing includes one or more of: bandpass filtering, normalizing time/frequency components and applying non-linear gain.

In accordance with any embodiments of the present disclosure, the first correlation computation technique comprises computing one-dimensional time-domain correlation between the first preprocessed reflected optical signal reflected from a first location in the first optical fiber and the second preprocessed reflected optical signal reflected from a second location in the second optical fiber for a given duration of time T.

In accordance with any embodiments of the present disclosure, the one-dimensional time-domain correlation is computed as:

$$C_{1D}(z_a, z_b) = \frac{\frac{1}{n_T}\sum_{i=1}^{n_T} \text{Real}\{u_a(t_i, z_a)u_b^*(t_i, z_b)\}}{\sqrt{\frac{1}{n_T}\sum_{i=1}^{n_T}|u_a(t_i, z_a)|^2}\sqrt{\frac{1}{n_T}\sum_{i=1}^{n_T}|u_b(t_i, z_b)|^2}},$$

where $u_a(t_i, z_a)$ is the first preprocessed reflected optical signal reflected from the first location $z_a$, $u_b(t_i, z_b)$ is the second preprocessed reflected optical signal reflected from the second location $z_b$, i is an index that varies from 1 to $n_T$, and $t_i$ is a time index.

In accordance with any embodiments of the present disclosure, the time index $t_i$ is related to the index i as:

$$t_i = \frac{(i-1)T}{n_T - 1}.$$

In accordance with any embodiments of the present disclosure, the first correlation computation technique comprises computing a two-dimensional time-domain correlation between the first preprocessed reflected optical signal reflected over a length L from a first location in the first optical fiber and the second preprocessed reflected optical signal reflected over the length L from a second location in the second optical fiber for a given duration of time T.

In accordance with any embodiments of the present disclosure, the two-dimensional time-domain correlation is computed as:

$$C_{2D}(z_a, z_b, L) = \frac{\frac{1}{n_L n_T}\sum_{j=1}^{n_L}\sum_{i=1}^{n_T} \text{Real}\{u_a(t_i, z_a + l_j)u_b^*(t_i, z_b + l_j)\}}{\sqrt{\frac{1}{n_L n_T}\sum_{j=1}^{n_L}\sum_{i=1}^{n_T} |u_a(t_i, z_a + l_j)|^2} \sqrt{\frac{1}{n_L n_T}\sum_{j=1}^{n_L}\sum_{i=1}^{n_T} |u_b(t_i, z_b + l_j)|^2}},$$

where $u_a(t_i, z_a+l_j)$ is the first preprocessed reflected optical signal reflected over a length $l_j$ from the first location $z_a$, $u_b(t_i, z_b+l_j)$ is the second preprocessed reflected optical signal reflected over a length $l_j$ from the second location $z_b$, i is an index that varies from 1 to $n_T$, j is an index that varies from 1 to $n_L$, $t_i$ is a time index and $l_j$ is a length index.

In accordance with any embodiments of the present disclosure, the time index $t_i$ is related to the index i as:

$$t_i = \frac{(i-1)T}{n_T - 1},$$

and the length index $l_j$ is related to index j as:

$$l_j = \frac{(j-1)L}{n_L - 1}.$$

In accordance with any embodiments of the present disclosure, the first correlation computation technique comprises: computing one-dimensional time-domain correlations between the first preprocessed reflected optical signal reflected from a first set of locations in the first optical fiber and the second preprocessed reflected optical signal reflected from a second set of locations in the second optical fiber for a given duration of time T; and computing an average value of the one-dimensional time-domain correlations In accordance with any embodiments of the present disclosure, for a first location from the first set of locations and a second location from the second set of locations, the associated one-dimensional time-domain correlation is computed as:

$$C_{1D}(z_a, z_b, l_j) = \frac{\frac{1}{n_T}\sum_{i=1}^{n_T} \text{Real}\{u_a(t_i, z_a + l_j)u_b^*(t_i, z_b + l_j)\}}{\sqrt{\frac{1}{n_T}\sum_{i=1}^{n_T} |u_a(t_i, z_a + l_j)|^2} \sqrt{\frac{1}{n_T}\sum_{i=1}^{n_T} |u_b(t_i, z_b + l_j)|^2}},$$

where $u_a(t_i, z_a+l_j)$ is the first preprocessed reflected optical signal reflected from the first location $z_a+l_j$, $u_b(t_i, z_b+l_j)$ is the second preprocessed reflected optical signal reflected from the second location $z_b+l_j$, i is an index that varies from 1 to $n_T$, and $t_i$ is a time index.

In accordance with any embodiments of the present disclosure, the second correlation computation technique comprises computing two-dimensional frequency-domain correlation between absolute frequency components of the first preprocessed reflected optical signal reflected over a length L from a first location in the first optical fiber and absolute frequency components of the second preprocessed reflected optical signal reflected over the length L from a second location in the second optical fiber.

In accordance with any embodiments of the present disclosure, the two-dimensional frequency-domain correlation is computed as:

$$C_{2D}(z_a, z_b, L) = \frac{\frac{1}{n_L n_f}\sum_{j=1}^{n_L}\sum_{i=1}^{n_f} |U_a(f_i, z_a + l_j)||U_b(f_i, z_b + l_j)|}{\sqrt{\frac{1}{n_L n_f}\sum_{j=1}^{n_L}\sum_{i=1}^{n_f} |U_a(f_i, z_a + l_j)|^2} \sqrt{\frac{1}{n_L n_f}\sum_{j=1}^{n_L}\sum_{i=1}^{n_f} |U_b(f_i, z_b + l_j)|^2}},$$

where $|U_a(f_i, z_a+l_j)|$ are the absolute frequency components of the first preprocessed reflected optical signal reflected over a length $l_j$ from the first location $z_a$, $|U_b(f_i, z_b+l_j)|$ are the absolute frequency components of the second preprocessed reflected optical signal reflected over a length $l_j$ from the second location $z_b$, i is an index that varies from 1 to $n_f$, j is an index that varies from 1 to $n_L$, $f_i$ is a frequency index and $l_j$ is a length index.

In accordance with any embodiments of the present disclosure, the frequency index $f_i$ is related to the index i as:

$$f_i = \frac{(i-1)(f_{max} - f_{min})}{n_f - 1} + f_{min},$$

where $f_{max}$ and $f_{min}$ are the maximum and minimum values of the absolute frequency components and the length index $l_j$ is related to index j as:

$$l_j = \frac{(j-1)L}{n_L - 1}.$$

In accordance with any embodiments of the present disclosure, the second correlation computation technique comprises: computing one-dimensional frequency-domain correlations between the absolute frequency components of the first preprocessed reflected optical signal reflected from a first set of locations in the first optical fiber and the absolute frequency components of the second preprocessed reflected optical signal reflected from a second set of locations in the second optical fiber; and computing an average value of the one-dimensional frequency-domain correlations.

In accordance with any embodiments of the present disclosure, for a first location from the first set of locations and a second location from the second set of locations, the associated one-dimensional frequency-domain correlation is computed as:

$$C_{1D}(z_a, z_b, l_j) = \frac{\frac{1}{n_f}\sum_{i=1}^{n_f}|U_a(f_i, z_a + l_j)||U_b(f_i, z_b + l_j)|}{\sqrt{\frac{1}{n_f}\sum_{i=1}^{n_f}|U_a(f_i, z_a + l_j)|^2}\sqrt{\frac{1}{n_f}\sum_{i=1}^{n_f}|U_b(f_i, z_b + l_j)|^2}},$$

where $|U_a(f_i, z_a+l_j)|$ are the absolute frequency components of the first preprocessed reflected optical signal reflected from the first location $z_a+l_j$, $|U_b(f_i,z_b+l_j)|$ are the absolute frequency components of the second preprocessed reflected optical signal reflected from the second location $z_b+l_j$, i is an index that varies from 1 to $n_f$, and $f_i$ is a frequency index.

In accordance with any embodiments of the present disclosure, detecting the improper protection in the optical communication network is based on a correlation threshold.

In accordance with any embodiments of the present disclosure, upon the computed correlation being greater than the correlation threshold, the first optical fiber and the second optical fiber are determined to be located in close proximity resulting in the improper protection in the optical communication network.

In accordance with the second broad aspect of the present disclosure, there is provided a system for detecting an improper protection in an optical communication network, the system comprising: a first Coherent-Optical Time Domain Reflectometer (C-OTDR) configured to receive a first reflected optical signal from a first optical fiber; a second C-OTDR configured to receive a second reflected optical signal from a first optical fiber; a non-transitory memory element having instructions thereon; a processor coupled to the non-transitory memory element and which execute the instructions to cause the processor to: preprocess the first reflected optical signal and the second reflected optical signal; determine a category of the first C-OTDR and the second C-OTDR; wherein, upon determining that the category of the first C-OTDR and the second C-OTDR is distributed acoustic sensing (DAS), compute a correlation between the first preprocessed reflected optical signal and the second preprocessed reflected optical signal based on a first correlation computation technique; wherein, upon determining that the category of the first C-OTDR and the second C-OTDR is distributed vibration sensing (DVS), compute a correlation between the first preprocessed reflected optical signal and the second preprocessed reflected optical signal based on a second correlation computation technique; and based on the computed correlation, detect the improper protection in the optical communication network.

In accordance with any embodiments of the present disclosure, the first correlation computation technique comprises one of: computing one-dimensional time-domain correlation between the first preprocessed reflected optical signal reflected from a first location in the first optical fiber and the second preprocessed reflected optical signal reflected from a second location in the second optical fiber for a given duration of time T; computing a two-dimensional time-domain correlation between the first preprocessed reflected optical signal reflected over a length L from a first location in the first optical fiber and the second preprocessed reflected optical signal reflected over the length L from a second location in the second optical fiber for a given duration of time T; and computing one-dimensional time-domain correlations between the first preprocessed reflected optical signal reflected from a first set of locations in the first optical fiber and the second preprocessed reflected optical signal reflected from a second set of locations in the second optical fiber for a given duration of time T, and computing an average value of the one-dimensional time-domain correlations.

In accordance with any embodiments of the present disclosure, the second correlation computation technique comprises one of: computing two-dimensional frequency-domain correlation between absolute frequency components of the first preprocessed reflected optical signal reflected over a length L from a first location in the first optical fiber and absolute frequency components of the second preprocessed reflected optical signal reflected over the length L from a second location in the second optical fiber; and computing one-dimensional frequency-domain correlations between the absolute frequency components of the first preprocessed reflected optical signal reflected from a first set of locations in the first optical fiber and the absolute frequency components of the second preprocessed reflected optical signal reflected from a second set of locations in the second optical fiber, and computing an average value of the one-dimensional frequency-domain correlations.

BRIEF DESCRIPTION OF THE FIGURES

The features and advantages of the present disclosure will become apparent from the following detailed description, taken in combination with the appended drawings, in which:

FIG. 9 depicts a flowchart representing a process directed to a method for detecting an improper protection in an optical communication network, in accordance with various embodiments of present disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Figure 1:
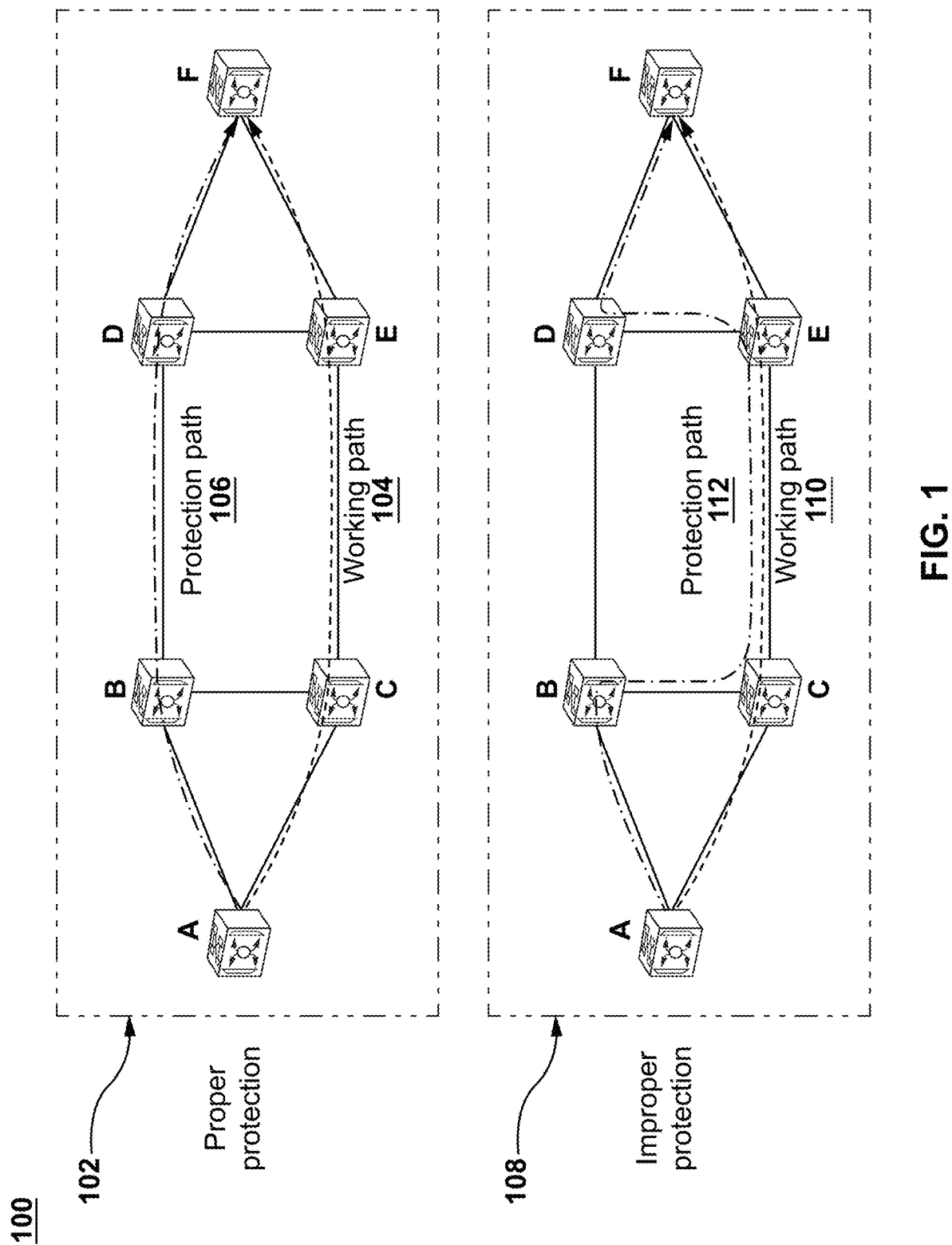
FIG. 1 depicts a block diagram of an optical network.

The instant disclosure is directed to addressing at least some of the deficiencies of the conventional techniques. In particular, the instant disclosure describes efficient systems and methods for detecting an improper protection in an optical communication network.

Unless otherwise defined or indicated by context, all technical and scientific terms used herein have the same meaning as commonly understood by one of ordinary skill in the art to which the described embodiments appertain to.

In the context of the present specification, "controller" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.).

In the context of the present specification, when an element is referred to as being "associated with" another element, in certain embodiments, the two elements can be directly or indirectly linked, related, connected, coupled, the second element employs the first element, or the like without limiting the scope of present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes efficient systems and methods for detecting an improper protection in an optical communication network.

Referring now to the drawings, FIG. 1 depicts a block diagram of an optical network 100. As shown, the optical network 100 typically includes a plurality of optical nodes that may include optical multiplexing sections (OMSs) comprising optical add-drop multiplexers, such as, for example, a reconfigurable optical add-drop multiplexers (ROADMs) A, B, C, D, E, and F each containing at least one wavelength selective switch (WSS). Each node may be configured to add, remove, and/or reroute a wavelength. Each OMS based node may further comprise multiple optical transport sections (OTSs), where at each OTS wavelength remains same.

Each node in the optical network 100 may also incorporate one or more laser light sources configured to produce, emit, or radiate pulses of light with certain pulse duration. In certain embodiments, one or more pulsed laser light sources may comprise one or more laser diodes, such as but not limited to: Fabry-Perot laser diode, a quantum well laser, a distributed Bragg reflector (DBR) laser, a distributed feedback (DFB) laser, or a vertical-cavity surface-emitting laser (VCSEL). Just as examples, a given laser diode may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable laser diode.

It is also contemplated that the emitted light may be single polarized, dual polarized, or randomly polarized, may have a particular polarization (e.g., linearly polarized, elliptically polarized, or circularly polarized).

Further, each node in the optical network 100 may incorporate multiple optical amplifiers, e.g., erbium-doped fiber amplifiers (EDFAs), for amplifying the optical signals. The optical network 100 may further employ one or more optical network elements and modules (which may include either or both of active and passive elements/modules), such as, for example, optical filters, WSSs, arrayed waveguide gratings, optical transmitters, optical receivers, processors and other suitable components. However, for purposes of simplicity and tractability, these elements have been omitted from FIG. 1.

It is contemplated that the nodes in the optical network 100 may be communicatively connected by virtue of links including optical cables, where each optical cable may include a plurality of optical fibers. The optical fiber may be of any suitable type such as, for example, single mode optical fiber, multi-mode optical fiber, standard single mode fibers (SSMFs), large effective area fibers (LEAFs) or the like. The links also include a plurality of optical amplifiers, such as, for example, EDFAs. The link between two nodes further includes optical amplifiers.

By way of example, an implementation of the optical network 100 may include a working path and a protection path. For example, in the optical network 100, a start node may be node A and the destination node may be node F. As depicted by 102 in FIG. 1, the working path 104 and protection path 106 may be disjoint in terms of optical fibers or optical cables. For example, in implementation 102 the working path 104 may be implemented using path A→C→E→F and the protection path 106 may be implemented using path A→B→D→F. As shown, in implementation 102, the working path 104 and the protection path 106 are completely disjointed. To this end, any one the optical cable or an optical fiber in the optical cable malfunctions due to any reason along the working path, traffic between node A and F may be redirected to the protection path.

In other implementations, such as depicted by implementation 108 of FIG. 1, at least a portion of working path 110 and a portion of protection path 112 share the same optical fiber, or different optical fibers but within same optical cable, or different optical fiber cables that are too close to each other. For example, in implementation 108 the working path 110 may be implemented using path A→C→E→F and the protection path 112 may be implemented using path A→B→C→E→D→F. As shown, in implementation 108 both the working path 110 and the protection path 112 have a common path segment C→E. To this end, in the event of any of the optical fiber in the optical cable malfunctions due to any reason, the traffic between node A and F may be redirected from the working path 110 to the protection path 112. However, if the malfunction occurs along path C→E, the communication between the node A and node B is completely interrupted for both the working path 110 and the protection path 112.

Generally, for survivability of the optical network 100, in case of failure to the working path 104, a common practice is to reserve the protection path 106 to detour the data traffic. For maximal protection, the working path 104 and the protection path 106 are required to be geographically disjoint. However, in the field, there are substantial scenarios of improper protection with the working path 104 and the protection path 106 ending up sharing at least a portion of the same fiber or the same cable, or the same duct/trench. To save networks proactively, systems and methods on how to identify improper protections are highly desirable. Various embodiments of the present disclosure are directed towards detecting improper design/assignment of protection paths in optical networks.

Conventional techniques rely on coherent Optical Time Domain Reflectometers (C-OTDRs), the C-OTDRs simultaneously monitor the two optical fibers under test. The conventional techniques generate 2D waterfall diagrams from the optical fibers under test. To determine whether two optical fibers are co-cable or not, strong events around the optical fiber (e.g., a vehicle passing over a buried optical fiber) which can create clear and distinct patterns/features in 2D waterfall diagrams is required.

Figure 2:
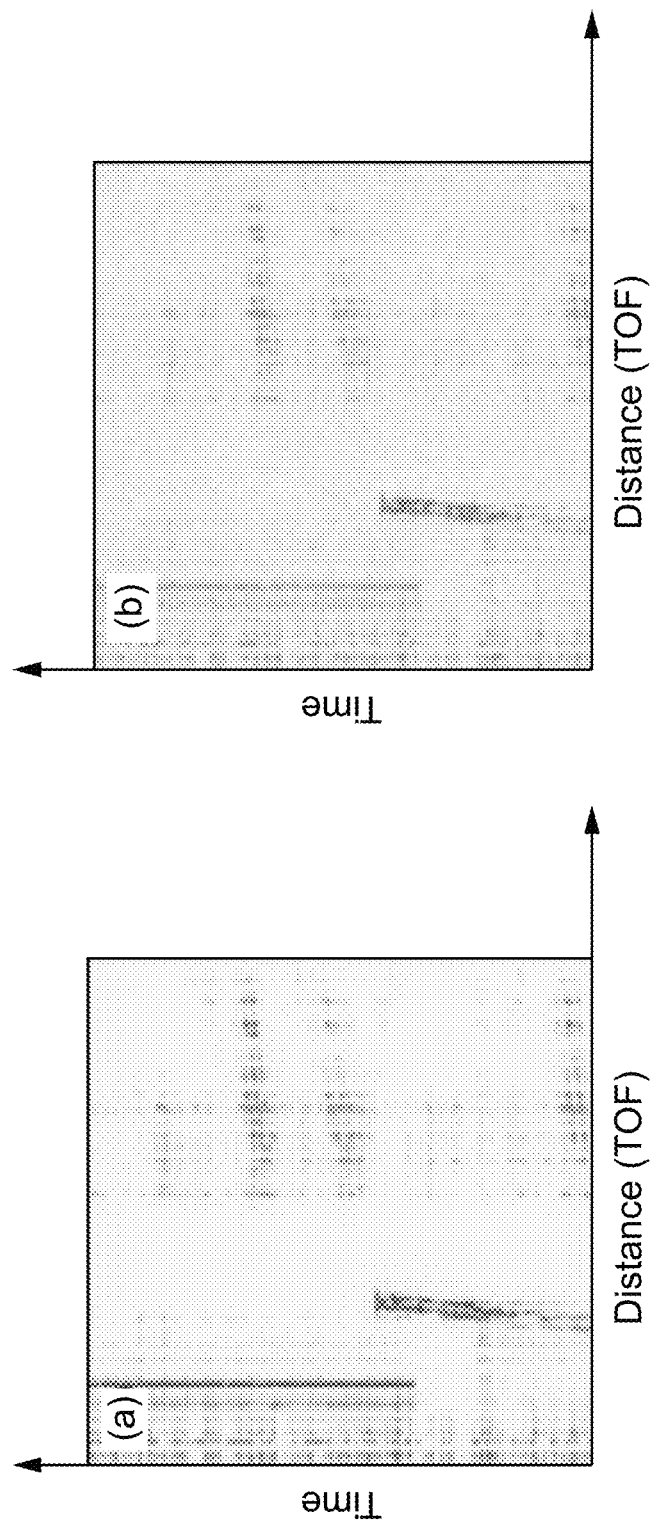
FIG. 2 (Prior Art) illustrates 2D waterfall diagrams corresponding to two optical fibers generated using conventional techniques.

FIG. 2 (Prior Art) illustrates 2D waterfall diagrams 200 corresponding to two optical fibers generated using conventional techniques. The conventional techniques rely on image processing techniques that requires strong perturbations to distinguish the two 2D waterfall diagrams. In practice with optical fibers subject to low-impact events and conditions, the optical fiber properties are weakly perturbed resulting in patterns/features in 2D waterfall diagrams buried in the noise. An immediate conventional solution is to deliberately apply strong mechanical vibrations to the areas hosting the optical fibers to obtain clear features in 2D waterfall diagrams. However, such a solution increases the operational cost and complexity of the test process.

Figure 3:
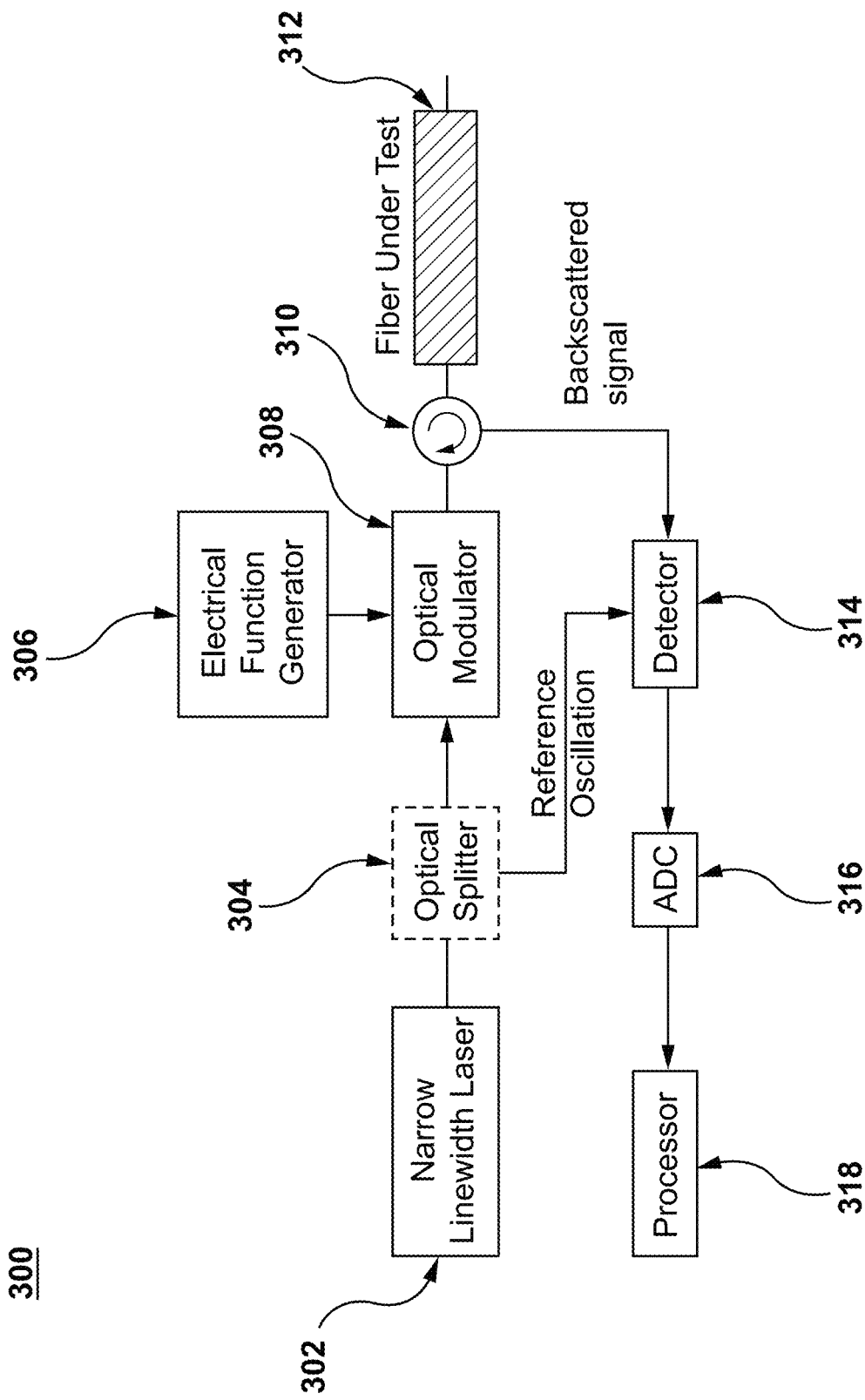
FIG. 3 illustrates a high-level functional block diagram of a C-OTDR configured to assist in detection of improper protection in the optical network, in accordance with various non-limiting embodiments of the present disclosure.

Various embodiments of the present disclosure rely on Coherent-OTDRs (C-OTDRs) for the detection of improper protection in the optical network 100. FIG. 3 illustrates a high-level functional block diagram of a C-OTDR 300 configured to assist in detection of improper protection in the optical network 100, in accordance with various non-limiting embodiments of the present disclosure. As shown, the C-OTDR 300 may include a narrow linewidth laser 302, an optical splitter 304, an electrical functional generator 306, an optical modulator 308, an input port 310, a detector 314, an analog-to-digital convertor (ADC) 316, and a processor 318. It is contemplated that the components illustrated corresponding to the C-OTDR 300 are merely representative and the C-OTDR 300 may include additional components which are not illustrated in FIG. 3 for the purpose of simplicity.

The narrow linewidth laser 302 may generate highly coherent optical signal having a long coherence time. The magnitude/phase of the coherent optical signal may be internally or externally modulated by the optical modulator 308 using a modulation signal generated by the electrical function generator 306. The optical modulator 308 may generate an arbitrarily modulated/coded optical signal to be launched into the fiber under test 312. At least a portion of the optical signal may be backscattered from the fiber under test 312. The backscattered optical signal may be reflected to the input port 310. The input port 310 may redirect the backscattered optical signal to the detector 314.

As noted above, the optical signal launched to the fiber under test 312 may be coherent and having a long coherence time, accordingly, the backscattered optical signal may be a result of coherent interference due to the inhomogeneities of the fiber under test 312. Such coherent optical interference may be highly sensitive to the local strain/temperature of the fiber under test 312 which itself depends on dynamic mechanical/thermal conditions surrounding the fiber under test 312. Various embodiments of the present disclosure may benefit from the sensitivity to identify whether or not the primary and protection paths are subject to similar ambient conditions as a result of their close proximity implying improper or proper protection, respectively.

It is contemplated that the detector 314 in the C-OTDR may be either based on distributed vibration sensing (DVS) system or may be based on distributed acoustic sensing (DAS) systems. The parameter to be monitored can be magnitude/phase/state of polarization information in the backscattered optical signal. Typically, in DVS systems, the magnitude information is collected and in DAS systems, the full-wave information (in-phase and quadrature) of backscattered optical signals is collected. The DAS and DVS systems may have a single polarization or polarization diverse design at the transmitter and/or receiver side.

The detector 314 may employ direct or coherent detection schemes corresponding to DVS or DAS systems, respectively. For coherent detection, a reference oscillator for example, the optical splitter 304 may be required to beat with the backscattered signal at the detector 314.

Generally, short optical pulses are periodically launched into the fiber under test 312. For every single pulse, a trace for the parameter of interest in the received backscattered optical signal versus the location where the scattering is originated from (i.e., fast axis, z) may be captured as the optical signal propagates along the fiber until its end. Fast axis (z) may be discretized ($z_j$) in correspondence to the sampling speed of the ADC 316. The C-OTDR 300 may launch $n_T$ pulses at times $t_i$, $n_T$ backscattering traces may be captured by the detector 314 to form a 2D waterfall diagram $w(t_i, z_i)$ showing how the backscattered optical signal from different locations of the fiber under test 312 (fast axis, z) is evolving over time (slow axis, t).

Figure 4:
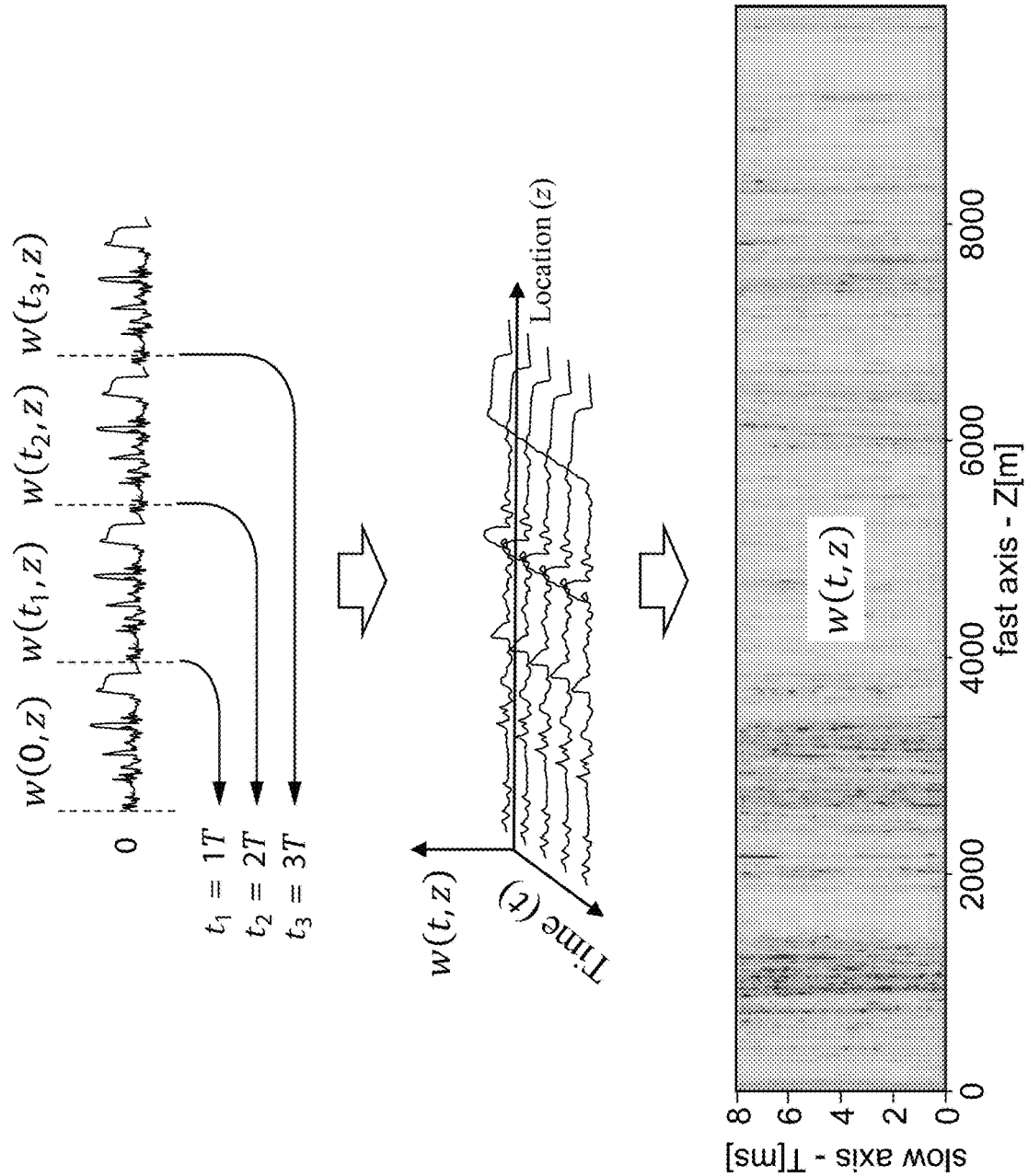
FIG. 4 illustrates a 2D waterfall diagram $w(t_i,z_i)$, in accordance with various non-liming embodiments of the present disclosure.

FIG. 4 illustrates a 2D waterfall diagram w(t,z) 400, in accordance with various non-liming embodiments of the present disclosure. The 2D waterfall diagram w(t,z) 400 may be generated by the C-OTDR 300 corresponding to the $n_T$ pulses, each pulse separated by a time interval of T.

Figure 5:
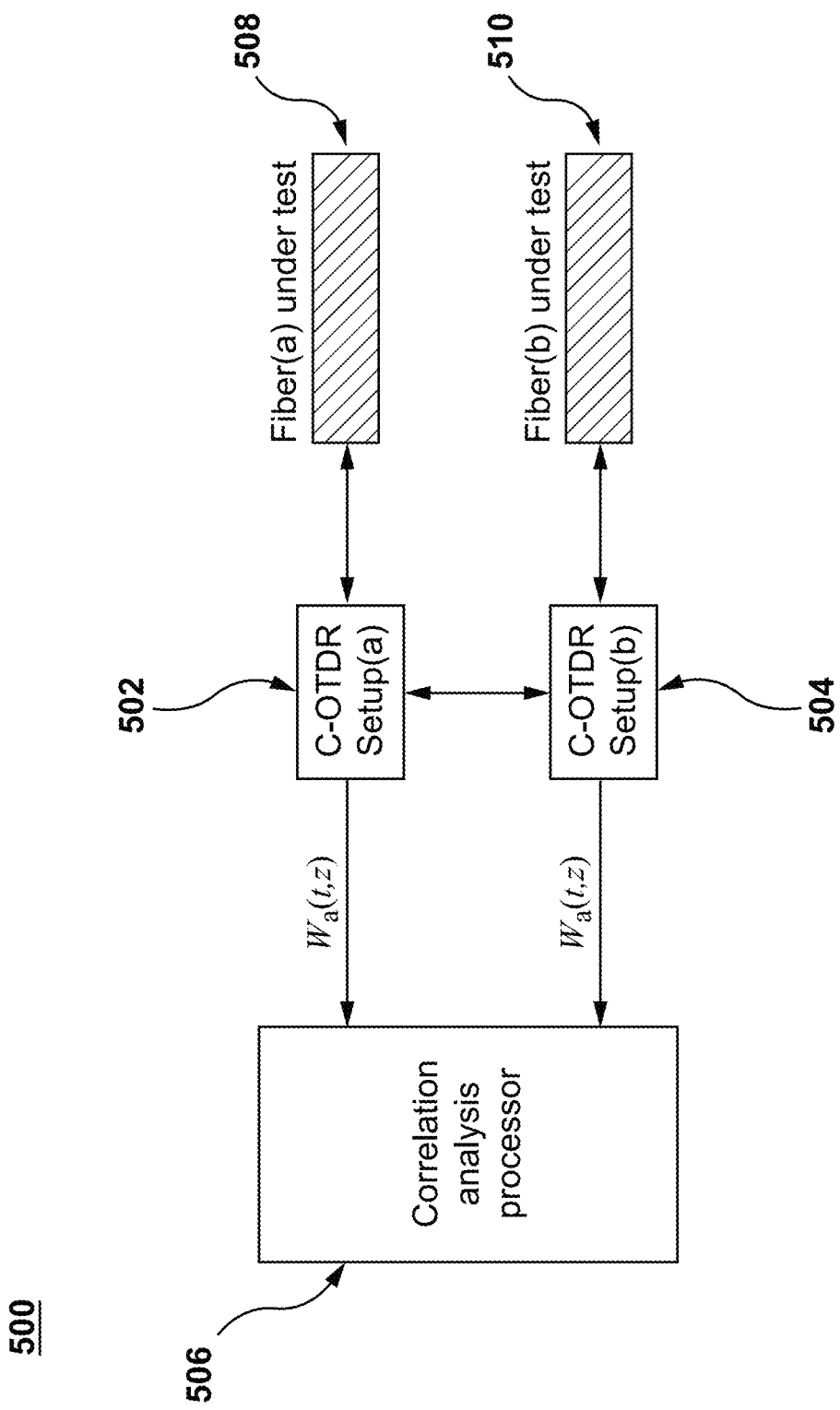
FIG. 5 illustrates a system for detecting an improper protection in an optical network, in accordance with various non-limiting embodiments of the present disclosure.

FIG. 5 illustrates a system 500 for detecting an improper protection in an optical network 100, in accordance with various non-limiting embodiments of the present disclosure. As shown, the system 500 may include a first C-OTDR 502, a second C-OTDR 504, and a correlation analysis processor 506. The C-OTDR 502, and the C-OTDR 504 may be implemented similar to the C-OTDR 300. The system 500 may include additional components, however, such components have been omitted from FIG. 5 for the purpose of simplicity.

The first C-OTDR 502 may be configured to launch a first optical signal to a first optical fiber under test 508. The first optical signal may include optical pulses generated at equal intervals of time. The first optical signal may be reflected from the first optical fiber under test 508. The first reflected signal may be received by the first C-OTDR 502 and the first C-OTDR 502 may generate a first 2D waterfall signal $w_a(t,z)$. In a similar manner, the second C-OTDR 504 may be configured to launch a second optical signal to a second optical fiber under test 510. The second optical signal may include optical pulses generated at equal intervals of time. The second optical signal may be reflected from the second optical fiber under test 510. The second reflected signal may be received by the second C-OTDR 504 and the first C-OTDR 504 may generate a second 2D waterfall signal $w_b(t,z)$. The first C-OTDR 502, and the second C-OTDR 504 may provide the 2D waterfall signals $w_a(t,z)$, and $w_b(t,z)$ to the correlation analysis processor 506.

The correlation analysis processor 506 may perform a correlation operation between the first 2D waterfall signal $w_a(t,z)$, and the second 2D waterfall signal $w_b(t,z)$ to determine any similarities therebetween. Based on the similarities, the correlation analysis processor 506 may determine if the first optical fiber under test 508 and the second optical fiber under test 510 are in close proximity.

To further improve the performance of the system 500, the correlation analysis processor 506 may perform pre-processing of the first 2D waterfall signal $w_a(t,z)$, and the second 2D waterfall signal $w_b(t,z)$. The pre-processing may include bandpass filtering, normalization of the time/frequency components and applying non-linear gain.

The correlation analysis processor 506 may perform a bandpass filtering over the first 2D waterfall signal $w_a(t,z)$, and the second 2D waterfall signal $w_b(t,z)$ in order to suppress low-frequency laser noises and high-frequency white noises beyond the range of expected vibrations. In certain non-limiting embodiments, the bandpass filtering may be in a frequency range of 10 Hz-500 Hz.

In certain non-limiting embodiments, the correlation analysis processor 506 may normalize the frequency contents of the first 2D waterfall signal $w_a(t,z)$, and the second 2D waterfall signal $w_b(t,z)$ over the entire lengths of the first optical fiber under test 508 and the second optical fiber under test 510 respectively. The normalization process may provide a balance to the portion of vibration sources at different frequencies in the correlation outcome.

In certain non-limiting embodiments, the correlation analysis processor 506 may apply a non-linear gain in the time domain or frequency domain to provide stronger weights to perturbation events in the correlation operation thereby improving the performance of the system 500.

By pre-processing, the correlation analysis processor 506 may generate a first preprocessed reflected optical signal $u_a(t,z)$, a second preprocessed reflected optical signal $u_b(t,z)$ from the first 2D waterfall signal $w_a(t,z)$, and the second 2D waterfall signal $w_b(t,z)$ respectively. The correlation analysis processor 506 may use the first preprocessed reflected optical signal $u_a(t,z)$, a second preprocessed reflected optical signal $u_b(t,z)$ to compute the correlation.

As previously noted, the first C-OTDR 502 and the second C-OTDR 504 may be based either on the DAS system or on the DVS system. The correlation analysis processor 506 may customize the correlation operation based on a category of the first C-OTDR 502 and the second C-OTDR 504. The correlation analysis processor 506 may determine the category of the first C-OTDR 502 and the second C-OTDR 504. In the event that the determined category is DAS system, the correlation analysis processor 506 may compute a correlation between the first preprocessed reflected optical signal $u_a(t,z)$ and the second preprocessed reflected optical signal $u_b(t,z)$ based on a first correlation computation technique. In the event that the determined category is DVS system, the correlation analysis processor 506 may compute a correlation between the first preprocessed reflected optical signal $u_a(t,z)$ and the second preprocessed reflected optical signal $u_b(t,z)$ based on a second correlation computation technique.

The DAS system may not be linear in the sense that the variations in the system output may not necessarily be linearly related to the input perturbations experienced by the first optical fiber under test 508 and the second optical fiber under test 510. Thus, under the same input perturbations, the first optical fiber under test 508 and the second optical fiber under test 510 may generate different output signal traces with minor correlation. Accordingly, in certain embodiments, the correlation analysis processor 506 may formulate a differential phase ($\Phi(t,z+\Delta z) - \Phi(t,z)$) which may be almost linearly following the fiber perturbations and may be partially immune to common noise terms.

In order to determine if the first optical fiber under test 508 at its longitudinal location $z_a$ is in close proximity of the second optical fiber under test 510 at its longitudinal location $z_b$, the correlation analysis processor 506 may compute one-dimensional time-domain correlation between the first preprocessed reflected optical signal $u_a(t,z)$ reflected from the first location $z_a$ in the first optical fiber under test 508 and the second preprocessed reflected optical signal $u_b(t,z)$ reflected from the second location $z_b$ in the second optical fiber under test 510 for a given duration of time T.

The one-dimensional time-domain correlation may be computed as:

$$C_{1D}(z_a, z_b) = \frac{\frac{1}{n_T}\sum_{i=1}^{n_T} \text{Real}\{u_a(t_i, z_a)u_b^*(t_i, z_b)\}}{\sqrt{\frac{1}{n_T}\sum_{i=1}^{n_T}|u_a(t_i, z_a)|^2} \sqrt{\frac{1}{n_T}\sum_{i=1}^{n_T}|u_b(t_i, z_b)|^2}} \quad (1)$$

where $u_a(t_i,z_a)$ may be the first preprocessed reflected optical signal reflected from the first location $z_a$, $u_b(t_i,z_b)$ is the second preprocessed reflected optical signal reflected from the second location $z_b$, i may be an index that varies from 1 to $n_T$, and $t_i$ may be a time index. The time index $t_i$ may be related to the index i as:

$$t_i = \frac{(i-1)T}{n_T - 1}.$$

In case the first optical fiber under test 508 at location $z_a$ is in close proximity to the second optical fiber under test 510 at location $z_b$, the computed correlation may illustrate a peak.

It is contemplated that the first optical fiber under test 508 and the second optical fiber under test 510 may share at least a portion of the respective paths and that the computing of a correlation between the first preprocessed reflected optical signal $u_a(t,z)$ and the second preprocessed reflected optical signal $u_b(t,z)$ over a L may provide a stronger correlation. The correlation analysis processor 506 may compute two-dimensional time-domain correlation between the first preprocessed reflected optical signal reflected $u_a(t,z)$ over a length L from the first location $z_a$ in the first optical fiber under test 508 and the second preprocessed reflected optical signal reflected $u_b(t,z)$ over the length L from the second location $z_b$ in the second optical fiber under test 510 for a given duration of time T. In other words, the correlation analysis processor 506 may compute a correlation between the first preprocessed reflected optical signal $u_a(t,z)$ reflected from the location $z_a$ to $z_a+L$ in the first optical fiber under test 508 and the second preprocessed reflected optical signal reflected $u_b(t,z)$ reflected from the location $z_b$ to $z_b+L$ in the second optical fiber under test 510.

The value of L may be preset based on a minimum expectation of the shared lengths of the first optical fiber under test 508 and the second optical fiber under test 510 considering that a longer L may allow for stronger correlation, which translates into greater reliability of detecting an improper protection in the optical network 100.

The two-dimensional time-domain correlation may be computed as:

$$C_{2D}(z_a, z_b, L) = \frac{\frac{1}{n_L n_T}\sum_{j=1}^{n_L}\sum_{i=1}^{n_T} \text{Real}\{u_a(t_i, z_a + l_j)u_b^*(t_i, z_b + l_j)\}}{\sqrt{\frac{1}{n_L n_T}\sum_{j=1}^{n_L}\sum_{i=1}^{n_T}|u_a(t_i, z_a + l_j)|^2} \sqrt{\frac{1}{n_L n_T}\sum_{j=1}^{n_L}\sum_{i=1}^{n_T}|u_b(t_i, z_b + l_j)|^2}} \quad (2)$$

where $u_a(t_i,z_a+l_j)$ may be the first preprocessed reflected optical signal reflected over a length $l_j$ from the first location $z_a$, $u_b(t_i,z_b+l_j)$ may be the second preprocessed reflected optical signal reflected over a length l from the second location $z_b$, i may be an index that varies from 1 to $n_T$, j may be an index that varies from 1 to $n_L$, $t_i$ may be a time index and $l_j$ may be a length index. The time index $t_i$ may be related to the index i as:

$$t_i = \frac{(i-1)T}{n_T - 1},$$

and the length index $l_j$ is related to index j as:

$$l_j = \frac{(j-1)L}{n_L - 1}.$$

Further, to enhance the performance, in certain non-limiting embodiments, the correlation analysis processor 506 average the two-dimensional time-domain correlation $C_{2D}(z_a, z_b, L)$ to improve the detectability of the peak.

Returning to FIG. 5, in another embodiment, the first correlation computation technique may be to compute one-dimensional time-domain correlations between the first preprocessed reflected optical signal $u_a(t,z)$ reflected from a first set of locations in the first optical fiber under test 508 and the second preprocessed reflected optical signal $u_b(t,z)$ reflected from a second set of locations in the second optical fiber under test 510 for a given duration of time T. The first set of locations in the first optical fiber under test 508 may be referred to as a discrete set of locations between the location $z_a$ and $z_a+L$. The second set of locations in the second optical fiber under test 510 may be referred to as a discrete set of locations between the location $z_b$ and $z_b+L$. The correlation analysis processor 506 may compute correlations between the first preprocessed reflected optical signal $u_a(t,z)$ and the second preprocessed reflected optical signal $u_b(t,z)$ for each location in the first set of locations and the second set of locations for a given duration of time T.

Further, the correlation analysis processor 506 may compute an average value of all one-dimensional time-domain correlations. In so doing, the correlation analysis processor 506 may compute two-dimensional time-domain correlation in terms of one-dimensional time-domain correlations. In some situations, this technique of computing the correlation embodiment may illustrate greater resilience to false detection of improper protection as this technique provides an equalization of the correlations.

The one-dimensional time-domain correlations and the average of the correlations may be computed as:

$$C_{1D}(z_a, z_b, l_j) = \frac{\frac{1}{n_T}\sum_{i=1}^{n_T} \text{Real}\{u_a(t_i, z_a + l_j)u_b^*(t_i, z_b + l_j)\}}{\sqrt{\frac{1}{n_T}\sum_{i=1}^{n_T}|u_a(t_i, z_a + l_j)|^2}\sqrt{\frac{1}{n_T}\sum_{i=1}^{n_T}|u_b(t_i, z_b + l_j)|^2}} \quad (3)$$

$$C_{2D}(z_a, z_b, L) = \frac{1}{n_L}\sum_{j=1}^{n_L} C_{1D}(z_a, z_b, l_j) \quad (4)$$

Returning to FIG. 5, as previously noted, in the event that the determined category is a DVS system, the correlation analysis processor 506 may compute a correlation between the first preprocessed reflected optical signal $u_a(t,z)$ and the second preprocessed reflected optical signal $u_b(t,z)$ based on the second correlation computation technique.

In DVS systems, the time invariant property of the system may enable a strong correlation in terms of absolute frequency content between the first preprocessed reflected optical signal $u_a(t,z)$ and the second preprocessed reflected optical signal $u_b(t,z)$ in case the first optical fiber under test 508 and the second optical fiber under test 510 in close proximity. Therefore, in some of the embodiments the absolute frequency content may be used for the second correlation computation technique.

In certain embodiments, the correlation analysis processor 506 may compute the Discrete Fourier Transform (DFT) of the first preprocessed reflected optical signal $u_a(t,z)$ and the second preprocessed reflected optical signal $u_b(t,z)$.

The correlation between the absolute frequency content the first preprocessed reflected optical signal $u_a(t,z)$ and the second preprocessed reflected optical signal $u_b(t,z)$ over a frequency range from $f_{min}$ to $f_{max}$ composed of $n_f$ discrete points may be computed as:

$$C_{2D}(z_a, z_b, L) = \frac{\frac{1}{n_L n_f}\sum_{j=1}^{n_L}\sum_{i=1}^{n_f} |U_a(f_i, z_a + l_j)||U_b(f_i, z_b + l_j)|}{\sqrt{\frac{1}{n_L n_f}\sum_{j=1}^{n_L}\sum_{i=1}^{n_f}|U_a(t_i, z_a + l_j)|^2}\sqrt{\frac{1}{n_L n_f}\sum_{j=1}^{n_L}\sum_{i=1}^{n_f}|U_b(t_i, z_b + l_j)|^2}} \quad (5)$$

where $|U_a(f_i,z_a+l_j)|$ are the absolute frequency components of the first preprocessed reflected optical signal reflected $u_a(t,z)$ over a length $l_j$ from the first location $z_a$, $|U_b(f_i,z_b+l_j)|$ are the absolute frequency components of the second preprocessed reflected optical signal reflected $u_b(t,z)$ over a length $l_j$ from the second location $z_b$, i is an index that varies from 1 to $n_f$, j is an index that varies from 1 to $n_L$, $f_i$ is a frequency index and $l_j$ is a length index. The frequency index $f_i$ is related to the index i as:

$$f_i = \frac{(i-1)(f_{max} - f_{min})}{n_f - 1} + f_{min},$$

where $f_{max}$ and $f_{min}$ are the maximum and minimum values of the absolute frequency components and the length index $l_j$ is related to index j as:

$$l_j = \frac{(j-1)L}{n_L - 1}.$$

The values of $f_{min}$ to $f_{max}$ may be set by frequency filtering process applied in the pre-processing stage.

Returning to FIG. 5, in another embodiment, the second correlation computation technique may operate to compute one-dimensional frequency-domain correlations between the first preprocessed reflected optical signal $u_a(t,z)$ reflected from the first set of locations in the first optical fiber under test 508 and the second preprocessed reflected optical signal $u_b(t,z)$ reflected from the second set of locations in the second optical fiber under test 510 for a given duration of time T.

Further, the correlation analysis processor 506 may compute an average value of all one-dimensional frequency-domain correlations. In so doing, the correlation analysis processor 506 may compute two-dimensional frequency-domain correlation in terms of one-dimensional frequency-domain correlations. In some situations, this technique of computing the correlation embodiment may illustrate greater resilience to false detection of improper protection as this technique provides an equalization of the correlations.

The one-dimensional frequency-domain correlations and the average of the correlations may be computed as:

$$C_{1D}(z_a, z_b, l_j) = \frac{\frac{1}{n_f}\sum_{i=1}^{n_f}|U_a(f_i, z_a+l_j)||U_b(f_i, z_b+l_j)|}{\sqrt{\frac{1}{n_f}\sum_{i=1}^{n_f}|U_a(f_i, z_a+l_j)|^2}\sqrt{\frac{1}{n_f}\sum_{i=1}^{n_f}|U_b(f_i, z_b+l_j)|^2}} \quad (5)$$

$$C_{2D}(z_a, z_b, L) = \frac{1}{n_L}\sum_{j=1}^{n_L}C_{1D}(z_a, z_b, l_j) \quad (6)$$

Figure 6:
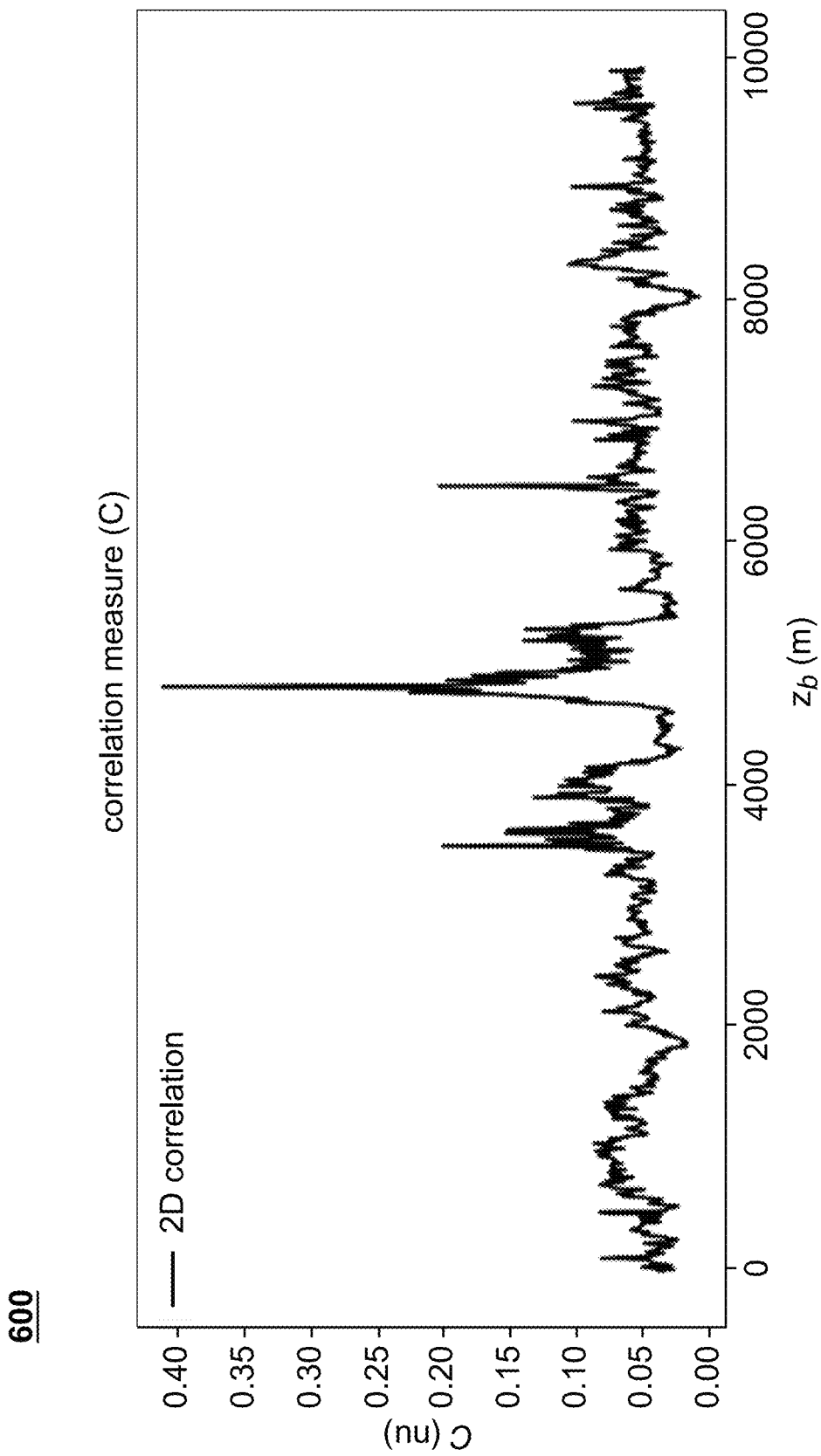
FIG. 6 illustrates simulation outcome of a computed two-dimensional frequency-domain correlation $C_{2D}(z_a,z_b, L)$, in accordance with various non-limiting embodiments of the present disclosure.

FIG. 6 illustrates a simulation outcome 600 of a computed two-dimensional frequency-domain correlation $C_{2D}(z_a, z_b, L)$, in accordance with various non-limiting embodiments of the present disclosure. In one example, $z_a$ is fixed at 4800 m and L set to be 100 m, $z_b$ is swept from 0 to 9900 m. The peak at $z_b$=4805 m are the indications of the close proximity of the first optical fiber under test 508 from 4800 m to 4900 m ($z_a$+L) and the second optical fiber under test 510 4805 m to 4905 m ($z_b$+L).

Figure 7:
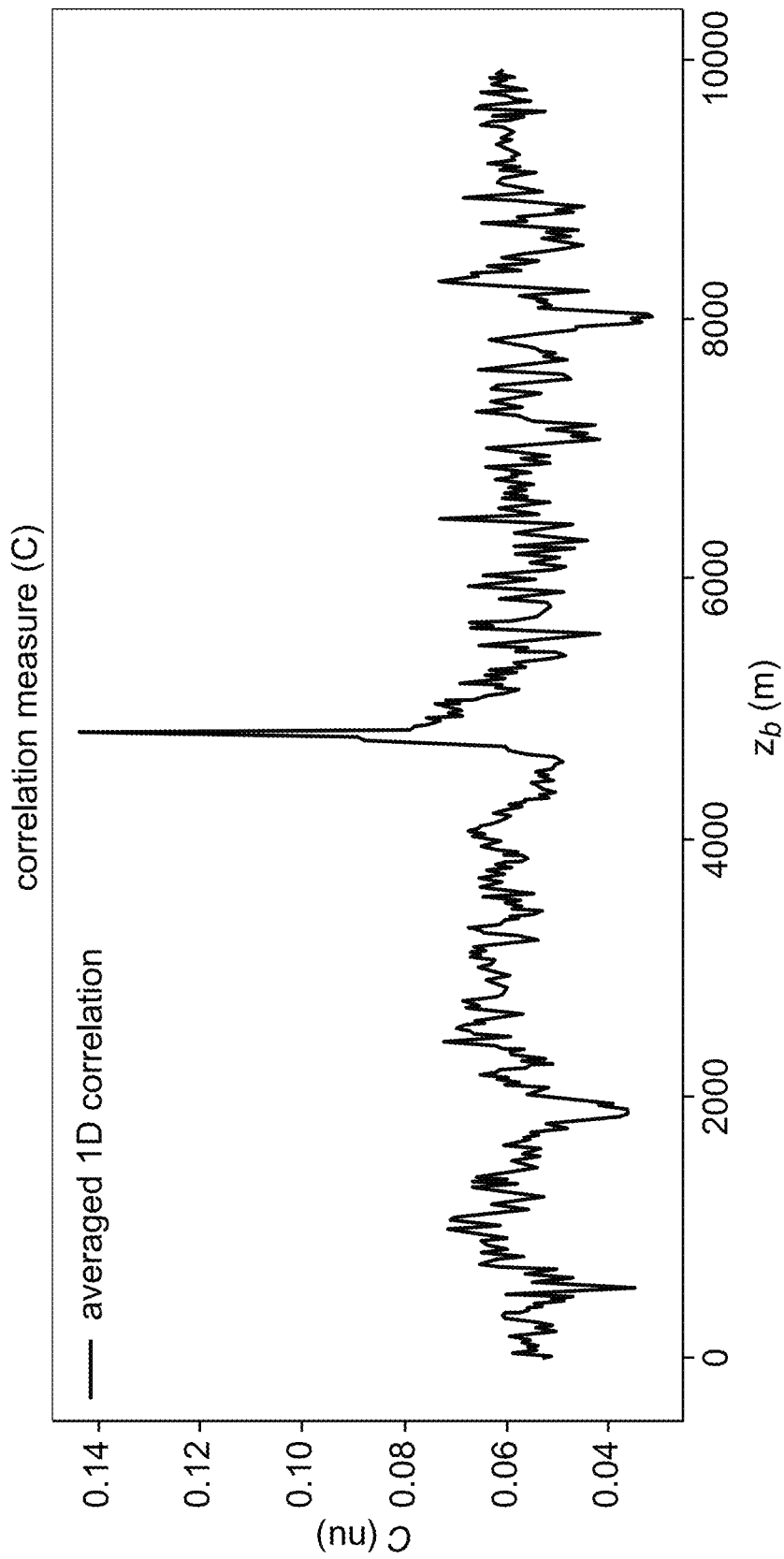
FIG. 7 illustrates simulation outcome of a computed averaged one-dimensional frequency-domain correlation $C_{2D}(z_a,z_b, L)$, in accordance with various non-limiting embodiments of the present disclosure.

FIG. 7 illustrates a simulation outcome 700 of a computed averaged one-dimensional frequency-domain correlation $C_{2D}(z_a, z_b, L)$, in accordance with various non-limiting embodiments of the present disclosure. As shown, the averaged one-dimensional frequency-domain correlation may illustrate better resilience to false detections with greater suppression of misleading peaks at 3495 m and 6460 m.

Once the correlation is computed, the correlation analysis processor 506 may detect the improper protection in the optical communication network based on a correlation threshold. The correlation threshold may set in terms of peak values in the computed correlation. In the event that the computed correlation is more than the correlation threshold, the first optical fiber under test 508 and the second optical fiber under test 510 may be determined to be located in close proximity resulting in the improper protection in the optical network 100.

Figure 8:
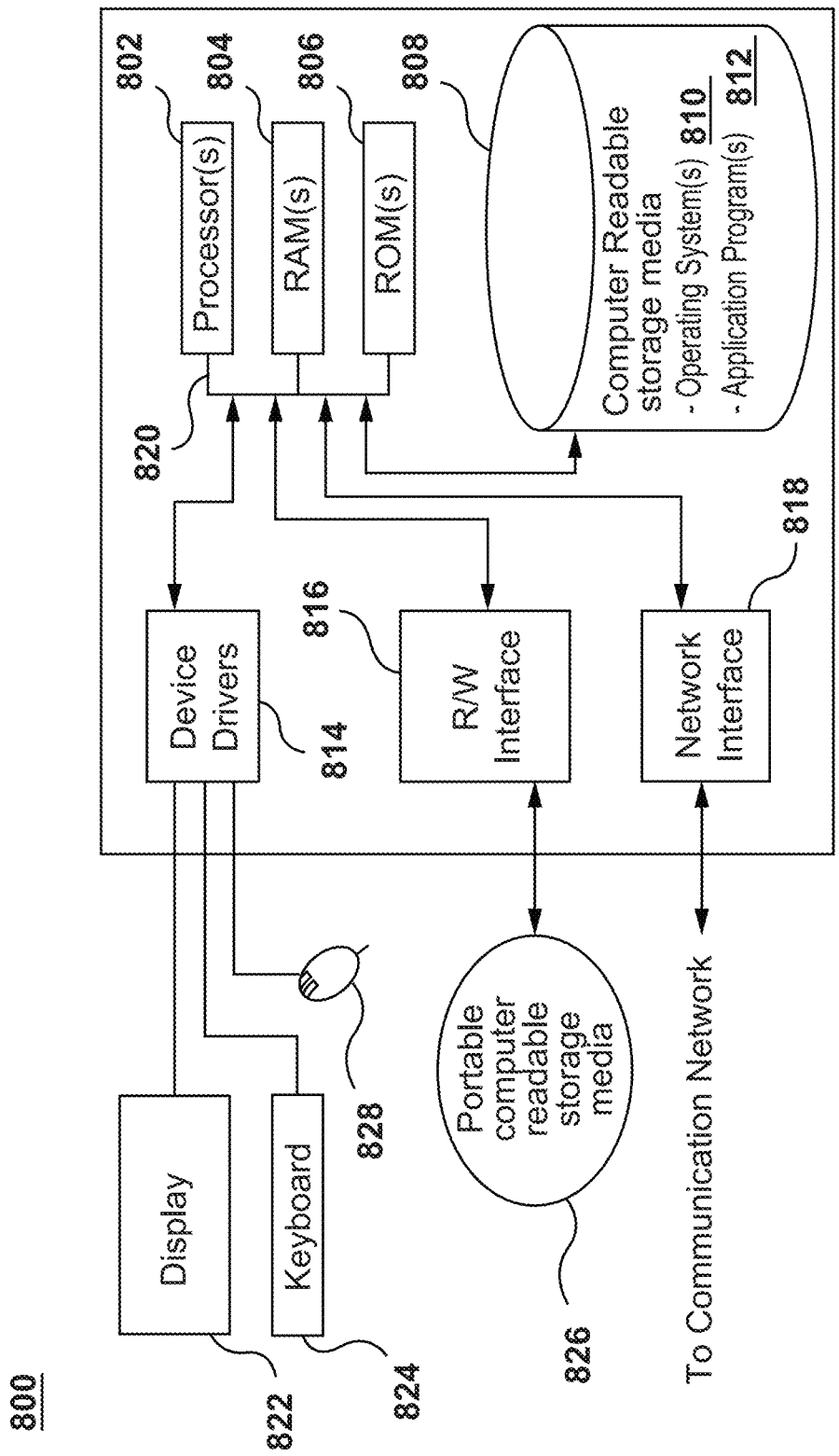
FIG. 8 depicts a high-level block diagram of representative components for the correlation analysis processor, in accordance with various embodiments of the present disclosure.

FIG. 8 depicts a high-level block diagram of representative components for the correlation analysis processor 506, in accordance with various embodiments of the present disclosure. It should be appreciated that FIG. 12 provides only an illustration of one implementation of the correlation analysis processor 506 and does not imply any limitations with regard to the environments in which different embodiments may be implemented. Many modifications to the depicted environment can be done to implement the correlation analysis processor 506 without departing from the principles presented herein.

As shown, the correlation analysis processor 506 employs one or more processors 802, one or more computer-readable random access memories (RAMs) 804, one or more computer-readable read only memories (ROMs) 806, one or more computer-readable storage media 808, device drivers 814, a read/write (R/W) interface 816, a network interface 818, all interconnected over a communications fabric 820. The communication fabric 820 may be implemented with any architecture designed for passing data and/or control information between processors (such as microprocessors, communications and network processors, etc.), memory, peripheral devices, and any other hardware components within a system.

One or more operating system(s) 810 and one or more application program(s) 812 are stored on one or more of computer-readable storage media 808 for execution by one or more of the processors 802 via one or more of the respective RAMs 804 (which typically include a cache memory). In the illustrated embodiment, each of computer-readable storage media 808 may be a magnetic disk storage device of an internal hard drive, CD-ROM, DVD, memory stick, magnetic tape, magnetic disk, optical disc, a semiconductor storage device such as RAM, ROM, EPROM, flash memory or any other computer-readable tangible storage device that can store a computer program and digital information.

The correlation analysis processor 506 may also include the R/W drive or interface 816 to read from and write to one or more portable computer readable storage media 828. Application programs 812 on said devices may be stored on one or more of the portable computer readable storage media 828, read via the respective R/W drive or interface 816 and loaded into the respective computer readable storage media 808.

It will be appreciated that in certain embodiments the application programs 812 stored on one or more of the portable computer readable storage media 828 may configure the correlation analysis processor 506 to provide various functionalities, in accordance with various embodiments of the present disclosure.

Application programs 812 on the correlation analysis processor 506 may be downloaded to the correlation analysis processor 506 from an external computer or external storage device via a communication network (for example, the Internet, a local area network or other wide area network or wireless network) and network interface 818. From network interface 818, the programs may be loaded onto computer-readable storage media 808.

The correlation analysis processor 506 may also include a display screen 822, a keyboard or keypad 824, and a computer mouse or touchpad 826. The device drivers 814 may interface to display screen 822 for imaging, to keyboard or keypad 824, to a computer mouse or touchpad 826, and/or to display screen 822 (in case of touch-screen display) for pressure sensing of alphanumeric character entry and user selections. The device drivers 814, R/W interface 816 and network interface 818 may comprise hardware and software (stored on computer-readable storage media 808 and/or ROM 804).

The programs described herein are identified based upon the application for which they are implemented in a particular embodiment of the present disclosure. However, it should be appreciated that any particular program nomenclature herein is used merely for convenience, and thus the disclosure should not be limited to use solely in any specific application identified and/or implied by such nomenclature.

It will be appreciated that the correlation analysis processor 506 may be a server, a desktop computer, a laptop computer, a tablet, a smartphone, a personal digital assistant or any device that may be configured to implement the present technology, as should be understood by a person skilled in the art.

FIG. 9 depicts a flowchart representing a process 900 directed to a method for detecting an improper protection in an optical communication network, in accordance with various embodiments of present disclosure. As shown, the process 900 commences at step 902, where the first C-OTDR 502 receives a first reflected optical signal from the first optical fiber under test 508.

The process 900 advances to step 904, where the second C-OTDR 504 receives a second reflected optical signal from the second optical fiber under test 510.

The process 900 proceeds to step 906, where the correlation analysis processor 506 pre-processes the first reflected optical signal and the second reflected optical signal. The pre-processing may include bandpass filtering, normalization of the time/frequency components and applying non-linear gain.

The process 900 moves to step 908, where the correlation analysis processor 506 determines a category of the first C-OTDR 502 and the second C-OTDR 504. The first C-OTDR 502 and the second C-OTDR 504 may be based on a DAS technique or a DVS technique.

The process 900 advances to step 910, where upon determining that the category of the first C-OTDR 502 and the second C-OTDR 504 is DAS, the correlation analysis processor 506 computes a correlation between the first preprocessed reflected optical signal and the second preprocessed reflected optical signal based on a first correlation computation technique.

The process 900 proceeds to step 912, where upon determining that the category of the first C-OTDR 502 and the second C-OTDR 504 is DVS, the correlation analysis processor 506 computes a correlation between the first preprocessed reflected optical signal and the second preprocessed reflected optical signal based on a second correlation computation technique.

Finally, at step 914, where based on the computed correlation, the correlation analysis processor 506 detects the improper protection in the optical communication network.

It is to be understood that the operations and functionality of various systems and methods of the present disclosure, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A method for detecting an improper protection in an optical communication network, the method comprising:
receiving, by a first Coherent-Optical Time Domain Reflectometer (C-OTDR), a first reflected optical signal from a first optical fiber;
receiving, by a second C-OTDR, a second reflected optical signal from a second optical fiber;
pre-processing, by a processor, the first reflected optical signal and the second reflected optical signal;
determining, by the processor, a category of the first C-OTDR and the second C-OTDR;
wherein, upon determining that the category of the first C-OTDR and the second C-OTDR is distributed acoustic sensing (DAS), computing a correlation between the first preprocessed reflected optical signal and the second preprocessed reflected optical signal based on a first correlation computation technique;
wherein, upon determining that the category of the first C-OTDR and the second C-OTDR is distributed vibration sensing (DVS), computing a correlation between the first preprocessed reflected optical signal and the second preprocessed reflected optical signal based on a second correlation computation technique; and
based on the computed correlation, detecting the improper protection in the optical communication network.

2. The method of claim 1, wherein the pre-processing includes one or more of: bandpass filtering, normalizing time/frequency components and applying non-linear gain.

3. The method of claim 1, wherein the first correlation computation technique comprises computing one-dimensional time-domain correlation between the first preprocessed reflected optical signal reflected from a first location in the first optical fiber and the second preprocessed reflected optical signal reflected from a second location in the second optical fiber for a given duration of time T.

4. The method of claim 3, wherein the one-dimensional time-domain correlation is computed as:

$$C_{1D}(z_a, z_b) = \frac{\frac{1}{n_T}\sum_{i=1}^{n_T} \text{Real}\{u_a(t_i, z_a)u_b^*(t_i, z_b)\}}{\sqrt{\frac{1}{n_T}\sum_{i=1}^{n_T}|u_a(t_i, z_a)|^2}\sqrt{\frac{1}{n_T}\sum_{i=1}^{n_T}|u_b(t_i, z_b)|^2}},$$

where $u_a(t_i,z_a)$ is the first preprocessed reflected optical signal reflected from the first location $z_a$, $u_b(t_i,z_b)$ is the second preprocessed reflected optical signal reflected from the second location $z_b$, i is an index that varies from 1 to $n_T$, and $t_i$ is a time index.

5. The method of claim 4, wherein the time index $t_i$ is related to the index i as:

$$t_i = \frac{(i-1)T}{n_T - 1}$$

6. The method of claim 1, wherein the first correlation computation technique comprises computing a two-dimensional time-domain correlation between the first preprocessed reflected optical signal reflected over a length L from a first location in the first optical fiber and the second preprocessed reflected optical signal reflected over the length L from a second location in the second optical fiber for a given duration of time T.

7. The method of claim 6, wherein the two-dimensional time-domain correlation is computed as:

$$C_{2D}(z_a, z_b, L) = \frac{\frac{1}{n_L n_T}\sum_{j=1}^{n_L}\sum_{i=1}^{n_T} \text{Real}\{u_a(t_i, z_a + l_j)u_b^*(t_i, z_b + l_j)\}}{\sqrt{\frac{1}{n_L n_T}\sum_{j=1}^{n_L}\sum_{i=1}^{n_T}|u_a(t_i, z_a + l_j)|^2}\sqrt{\frac{1}{n_L n_T}\sum_{j=1}^{n_L}\sum_{i=1}^{n_T}|u_b(t_i, z_b + l_j)|^2}},$$

where $u_a(t_i,z_a+l_j)$ is the first preprocessed reflected optical signal reflected over a length $l_j$ from the first location $z_a$, $u_b(t_i,z_b+l_j)$ is the second preprocessed reflected optical signal reflected over a length $l_j$ from the second location $z_b$, i is an index that varies from 1 to $n_T$, j is an index that varies from 1 to $n_L$, $t_i$ is a time index and $l_j$ is a length index.

8. The method of claim 7, wherein the time index $t_i$ is related to the index i as:

$$t_i = \frac{(i-1)T}{n_T - 1},$$

and the length index $l_j$ is related to index j as:

$$l_j = \frac{(j-1)L}{n_L - 1}.$$

9. The method of claim 1, wherein the first correlation computation technique comprises:
computing one-dimensional time-domain correlations between the first preprocessed reflected optical signal reflected from a first set of locations in the first optical fiber and the second preprocessed reflected optical signal reflected from a second set of locations in the second optical fiber for a given duration of time T; and
computing an average value of the one-dimensional time-domain correlations.

10. The method of claim 9, wherein for a first location from the first set of locations and a second location from the second set of locations, the associated one-dimensional time-domain correlation is computed as:

$$C_{1D}(z_a, z_b, l_j) = \frac{\frac{1}{n_T}\sum_{i=1}^{n_T} \text{Real}\{u_a(t_i, z_a + l_j)u_b^*(t_i, z_b + l_j)\}}{\sqrt{\frac{1}{n_T}\sum_{i=1}^{n_T}|u_a(t_i, z_a + l_j)|^2}\sqrt{\frac{1}{n_T}\sum_{i=1}^{n_T}|u_b(t_i, z_b + l_j)|^2}},$$

where $u_a(t_i, z_a+l_j)$ is the first preprocessed reflected optical signal reflected from the first location $z_a+l_j$, $u_b(t_i, z_b+l_j)$ is the second preprocessed reflected optical signal reflected from the second location $z_b+l_j$, i is an index that varies from 1 to $n_T$, and $t_i$ is a time index.

11. The method of claim 1, wherein the second correlation computation technique comprises computing two-dimensional frequency-domain correlation between absolute frequency components of the first preprocessed reflected optical signal reflected over a length L from a first location in the first optical fiber and absolute frequency components of the second preprocessed reflected optical signal reflected over the length L from a second location in the second optical fiber.

12. The method of claim 11, wherein the two-dimensional frequency-domain correlation is computed as:

$$C_{2D}(z_a, z_b, L) = \frac{\frac{1}{n_L n_f}\sum_{j=1}^{n_L}\sum_{i=1}^{n_f}|U_a(f_i, z_a + l_j)||U_b(f_i, z_b + l_j)|}{\sqrt{\frac{1}{n_L n_f}\sum_{j=1}^{n_L}\sum_{i=1}^{n_f}|U_a(f_i, z_a + l_j)|^2}\sqrt{\frac{1}{n_L n_f}\sum_{j=1}^{n_L}\sum_{i=1}^{n_f}|U_b(f_i, z_b + l_j)|^2}},$$

where $|U_a(f_i, z_a+l_j)|$ are the absolute frequency components of the first preprocessed reflected optical signal reflected over a length $l_j$ from the first location $z_a$, $|U_b(f_i, z_b+l_j)|$ are the absolute frequency components of the second preprocessed reflected optical signal reflected over a length $l_j$ from the second location $z_b$, i is an index that varies from 1 to $n_f$, j is an index that varies from 1 to $n_L$, $f_i$ is a frequency index and $l_j$ is a length index.

13. The method of claim 12, wherein the frequency index $f_i$ is related to the index i as:

$$f_i = \frac{(i-1)(f_{max} - f_{min})}{n_f - 1} + f_{min},$$

where $f_{max}$ and $f_{min}$ are the maximum and minimum values of the absolute frequency components and the length index $l_j$ is related to index j as:

$$l_j = \frac{(j-1)L}{n_L - 1}.$$

14. The method of claim 1, wherein the second correlation computation technique comprises:
computing one-dimensional frequency-domain correlations between the absolute frequency components of the first preprocessed reflected optical signal reflected from a first set of locations in the first optical fiber and the absolute frequency components of the second preprocessed reflected optical signal reflected from a second set of locations in the second optical fiber; and
computing an average value of the one-dimensional frequency-domain correlations.

15. The method of claim 14, wherein for a first location from the first set of locations and a second location from the second set of locations, the associated one-dimensional frequency-domain correlation is computed as:

$$C_{1D}(z_a, z_b, l_j) = \frac{\frac{1}{n_f}\sum_{i=1}^{n_f}|U_a(f_i, z_a + l_j)||U_b(f_i, z_b + l_j)|}{\sqrt{\frac{1}{n_f}\sum_{i=1}^{n_f}|U_a(f_i, z_a + l_j)|^2}\sqrt{\frac{1}{n_f}\sum_{i=1}^{n_f}|U_b(f_i, z_b + l_j)|^2}},$$

where $|U_a(f_i, z_a+l_j)|$ are the absolute frequency components of the first preprocessed reflected optical signal reflected from the first location $z_a+l_j$, $|U_b(f_i, z_b+l_j)|$ are the absolute frequency components of the second preprocessed reflected optical signal reflected from the second location $z_b+l_j$, i is an index that varies from 1 to $n_f$, and $f_i$ is a frequency index.

16. The method of claim 1, wherein detecting the improper protection in the optical communication network is based on a correlation threshold.

17. The method of claim 16 wherein, upon the computed correlation being greater than the correlation threshold, the first optical fiber and the second optical fiber are determined to be located in close proximity resulting in the improper protection in the optical communication network.

18. A system for detecting an improper protection in an optical communication network, the system comprising:
a first Coherent-Optical Time Domain Reflectometer (C-OTDR) configured to receive a first reflected optical signal from a first optical fiber;

a second C-OTDR configured to receive a second reflected optical signal from a second optical fiber;
a non-transitory memory element having instructions thereon;
a processor coupled to the non-transitory memory element and which execute the instructions to cause the processor to:
pre-process the first reflected optical signal and the second reflected optical signal;
determine a category of the first C-OTDR and the second C-OTDR;
wherein, upon determining that the category of the first C-OTDR and the second C-OTDR is distributed acoustic sensing (DAS), compute a correlation between the first preprocessed reflected optical signal and the second preprocessed reflected optical signal based on a first correlation computation technique;
wherein, upon determining that the category of the first C-OTDR and the second C-OTDR is distributed vibration sensing (DVS), compute a correlation between the first preprocessed reflected optical signal and the second preprocessed reflected optical signal based on a second correlation computation technique; and
based on the computed correlation, detect the improper protection in the optical communication network.

19. The system of claim 18, wherein the first correlation computation technique comprises one of:
computing one-dimensional time-domain correlation between the first preprocessed reflected optical signal reflected from a first location in the first optical fiber and the second preprocessed reflected optical signal reflected from a second location in the second optical fiber for a given duration of time T;
computing a two-dimensional time-domain correlation between the first preprocessed reflected optical signal reflected over a length L from a first location in the first optical fiber and the second preprocessed reflected optical signal reflected over the length L from a second location in the second optical fiber for a given duration of time T; and
computing one-dimensional time-domain correlations between the first preprocessed reflected optical signal reflected from a first set of locations in the first optical fiber and the second preprocessed reflected optical signal reflected from a second set of locations in the second optical fiber for a given duration of time T, and computing an average value of the one-dimensional time-domain correlations.

20. The system of claim 18, wherein the second correlation computation technique comprises one of:
computing two-dimensional frequency-domain correlation between absolute frequency components of the first preprocessed reflected optical signal reflected over a length L from a first location in the first optical fiber and absolute frequency components of the second preprocessed reflected optical signal reflected over the length L from a second location in the second optical fiber; and
computing one-dimensional frequency-domain correlations between the absolute frequency components of the first preprocessed reflected optical signal reflected from a first set of locations in the first optical fiber and the absolute frequency components of the second preprocessed reflected optical signal reflected from a second set of locations in the second optical fiber, and computing an average value of the one-dimensional frequency-domain correlations.

* * * * *